18 States Patent Office 3,042,551
Patented July 3, 1962

3,042,551
IMPREGNATION OF POROUS METAL
Henry James Harkness Perry, The Lings, Little Abington, Cambridgeshire, Abington, England
No Drawing. Filed June 23, 1960, Ser. No. 38,135
Claims priority, application Great Britain June 30, 1959
2 Claims. (Cl. 117—224)

Porous plates sometimes require to be impregnated with a solution of a metallic salt. For example, plates of porous metal or metallic oxide such as the porous nickel electrodes used in fuel cells may require treatment in this manner. In particular, the electrodes of fuel cells of the oxygen/hydrogen type may require to be impregnated with a lithium salt in order that the nickel oxide which is formed in the pores of the oxygen electrode should include a proportion of lithium. This reduces the electrical resistance of the electrode as described and claimed in the specification of British Patent No. 725,661 and U.S. 2,716,670. For this purpose it is convenient to impregnate the porous nickel with a solution of a lithium salt such as the hydroxide and then to heat the electrode so as to drive off the water and thus deposit the lithium hydroxide through the porous body.

In general the body of porous nickel is in the form of a thin plate or disc and when it is heated the water is able to evaporate all over the face of the plate. In practice, however, it is found that the rate of evaporation is greatest close to the edges and that as a consequence the lithium hydroxide tends to concentrate around the edges giving an uneven distribution of the lithium within the porous body which is undesirable. Similar difficulties arise in the impregnation of porous plates in general.

According to the present invention the impregnation of a porous plate is carried out with a solution containing both the salt required for impregnation purposes and also a second solute, preferably of high solubility, in such concentration that the solution is saturated, or nearly so, and the plate is then subsequently heated to drive off the liquid from the solution in the usual way. The result of the use of a concentrated solution is that it it more viscous than solutions normally used for impregnation purposes and it is found that the use of such a solution tends to overcome the difficulty referred to above in that it leads to a relatively even distribution of the salt which is required for impregnation purposes throughout the body of the plate after the evaporation of the liquid in the solution.

It is thought that this is probably due to the fact that as soon as a relaively small quantity of liquid has evaporated from the concentrated solution, there is a mechanical blockage of the pores by the deposition of crystals from the solution, thus preventing migration of the impregnating salt.

Moreover, the increased viscosity of the resultant solution facilities accurate measurement of the quantity of the impregnating salt added to the porous plate since less of the solution drains from the porous body during handling after impregnation.

When a fuel cell electrode is to be impregnated, the impregnating solution contains both a lithium salt in the usual way together with the second solute in sufficient concentration to give a solution which is saturated or nearly so.

Preferably, the second solute is hygroscopic and this is found still further to improve the results obtained, probably owing to the fact that it produces a more even evaporation of liquid from the body of the plate with the result tha no porion of the body is dry while another portion is wet. This helps to prevent any resultant capillary forces which might cause migration of the impregnating salt.

In the case of a fuel cell electrode the hydroscopic material is preferably nickel nitrate which is considerably more soluble in water than lithium hydroxide, thus leading to an appreciable increase in the viscosity of the solution. If the nickel nitrate is used in conjunction with lithium nitrate, it is found to give considerably more effective lithiation of the nickel oxide which is subsequently formed in the electrode. The use of a nickel salt is also particularly advantageous in that it assists activation of the electrode. Activation in this way is referred to in the specification of British Patent No. 667,298 and by adding the nickel salt at the same time as the lithium salt the lithium ion is distributed throughout the nickel oxide which serves as the activating substance and which is later produced in the electrode by thermal decomposition.

As a general consideration the second solute which is used should either contribute to the final structure of the porous plate as in the case of the nickel salt used in the fuel cell electrode or, alternatively, it should be entirely removed from the porous body by the subsequent heating process. Substances suitable for this latter purpose are ammonium nitrate and urea. The second solute must also be selected so as not to produce or precipitate with the impregnating salt when dissolved in the solvent.

In a particular example of the impregnation of a porous nickel electrode for use in an oxygen/hydrogen type fuel cell the impregnating solution comprised 1000 grammes of nickel nitrate hexahydrate and 200 grammes of lithium nitrate trihydrate in 1 litre of aqueous solution. The electrode to be impregnated was placed in a vessel evacuated by means of a water pump to produce a vacuum of approximately 20 mm. of mercury. After maintaining the vacuum for one minute the impregnating solution was allowed to flow into the vessel. The pumping was then continued for a further minute while the electrode was entirely immersed in solution. The vacuum was then released and the resultant air pressure served to drive the impregnating solution into the pores of the nickel plate. The electrode was allowed to remain for one minute in the solution before being removed and drained. It was found that the length of the draining time was not critical owing to the high viscosity of the solution.

The electrode was dried horizontally at a temperature of approximately 150° C. for a period of approximately 60 minutes. After drying the electrode was heated for 30 minutes at 700° C., thus decomposing the mixed nickel and lithium nitrates to give the required lithiated nickel oxide. It was found that with this method a much more uniform disribution of the lithium was obtained and that, moreover, the precise degree of lithiation could be determined more accurately.

I claim:
1. A method of forming a porous nickel electrode for a fuel cell impregnated with a lithium salt relatively evenly distributed in the electrode which comprises providing an aqueous solution of a lithium salt and a nickel salt dis- solved in the solution in such concentration as to form a viscous solution impregnating a porous nickel electrode with the solution and subsequently heating the impregnated electrode to drive off water from the electrode.

2. A method of forming a porous nickel electrode for a fuel cell impregnated with a lithium salt relatively evenly distributed in the electrode which comprises providing an aqueous solution of lithium nitrate and nickel nitrate dissolved in the solution to substantially saturtion concentration forming a viscous solution impregnating a porous nickel electrode with the solution and subsequently heating the impregnated electrode to drive off water from the electrode.

References Cited in the file of this patent

UNITED STATES PATENTS

| | | |
|---|---|---|
| 975,885 | Morrison | Nov. 15, 1910 |
| 2,813,807 | Levi | Nov. 19, 1957 |
| 2,952,570 | Heuninckx | Sept. 13, 1960 |

FOREIGN PATENTS

| | | |
|---|---|---|
| 725,661 | Great Britain | Mar. 9, 1955 |
| 1,002,831 | Germany | Feb. 21, 1957 |